INVENTOR
HAROLD R. NEWELL

United States Patent Office 3,530,322
Patented Sept. 22, 1970

3,530,322
STEP MOTOR WITH VARIABLE TILT
Harold R. Newell, South Newbury, N.H., assignor to Mesur-Matic Electronics Corporation, Warner, N.H., a corporation of Delaware
Filed Apr. 24, 1968, Ser. No. 723,807
Int. Cl. H02k 7/10
U.S. Cl. 310—82                                5 Claims

ABSTRACT OF THE DISCLOSURE

A step motor has a shaft sharing a common axis with a pair of planar ring gears whose teeth confront each other in normally spaced parallel planes. A rotor supporting one of the gears is pivotally coupled to the shaft to permit inclination thereon, and a stator is provided to deflect the rotor to produce meshing of the gears along a limited sector in a wobbling motion about the shaft. The spacing between the gears, and hence the angle of inclination or tilt of the rotor to produce the deflection sufficient to cause meshing of the gears, is varied according to whether slow speed or high speed wobbling is desired, by a solenoid coil and core that selectively deflect the shaft along its axis.

BACKGROUND OF THE INVENTION

In my copending application for United States Letters Patent, bearing Ser. No. 664,331, entitled "Harmonic Drive for Digital Step Motors," filed Aug. 30, 1967, I disclose an electromagnetic stepping motor employing a wobbling rotor element which undergoes stepped rotation according to the sequentially switched excitation of the motor phases by energization of appropriate stator windings. In a typical embodiment, a pair of cooperating circular ring gears having intermeshing teeth projecting from confronting planes are fastened to the rotor element and to the motor housing, respectively, for mating engagement over a limited tooth sector as the rotor element, e.g., a disk, is successively drawn toward the energized stator windings in a wobble motion about the motor shaft. The stator core is positioned in the motor housing with a plurality of cores having respective windings thereon, encompassing the shaft which is mounted for rotation in one or more sets of bearings. The position at which the rotor ring gear meshes with the stationary ring gear attached to the housing undergoes progressive motion with time; that is to say, the area of teeth engagement propagates sinusoidally about the shaft in accordance with the wobble motion, the rotor constituting a mass that rotates at an extremely low rate depending upon tooth differential between the gears, number of motor phases, and switching format for the phases. If no tooth differential exists, the rotor or armature simply wobbles on the "tracks" provided by the gears, with no rotatory motion relative to the housing. A relative rotation occurs between the two ring gears in the event of a tooth differential, and if the rotor gear has the fewer teeth, it rotates that number of fewer teeth for each revolution of the wobble (i.e., each revolution of the intermeshed area of the gears), in a direction opposite the direction of rotation of the wobble.

The wobbling rotor element is coupled to the shaft for relative rotation therewith by a universal joint free to move longitudinally along the shaft but substantially confined to prevent radial movement. The rotor pivots on the universal joint, and a second inner pair of ring gears is provided by which the rotor drives the shaft as it undergoes its wobbling rotation relative to the housing. Thus, the shaft rotates in discrete (stepped) displacements according to excitation of the motor phases, whether or not there is a tooth differential between the inner set of gears.

The pole faces of the stator core are milled off at a slight angle (e.g., 1°) relative to a plane normal to the shaft, to provide an angle through which the rotor pivots on the universal joint during its wobble motion. This wobble angle or tilt angle of the rotor is one of the principal factors governing the force required to wobble the rotor, others including the mass of the rotor (thickness and diameter of the disk) and the desired rate of wobble. Neglecting losses due to friction, the force required to wobble a rotor disk increases in direct proportion to the wobble angle and the thickness and as the square of the diameter and of the wobble rate.

It is a principal object of the present invention to provide a step motor having a wobbling rotor element whose wobble rate is increased for a given amount of force, relative to previous step motors of the same general type.

One method by which to increase rotor wobble rate for a specified force is to decrease the tilt angle of the rotor, as may be observed by consideration of the aforementioned factors dictating force required to produce wobble. However, as the tilt angle is decreased, there is a consequent decrease in the accuracy of positioning of the rotor over the energized stator poles. Accordingly, accuracy of shaft position per step is degraded.

It is another important object of the present invention to provide high accuracy and high wobble rate for a specified force in a multiphase step motor.

SUMMARY OF THE INVENTION

Briefly, according to the present invention, high speed operation of the step motor is achieved with relatively lower force than has heretofore been necessary, and without sacrificing accuracy per step, by selectively varying the tilt angle of the rotor according to the desired operational speed. In particular, the tilt angle is selectively decreased as the wobble rate is to be increased, and vice versa. One means for achieving this performance, as will be discussed in greater detail in the description of a preferred embodiment, is a solenoid arrangement by which to change the location of the rotor element relative to the stationary outergear, along the axis of rotation.

BRIEF DESCRIPTION OF THE DRAWING

The above and still further objects, features, and attendant advantages of the present invention will become apparent from a consideration of the following detailed description of a preferred embodiment thereof, especially when taken in conjunction with the accompanying drawing, in which.

DESCRIPTION OF THE PREFERRED EMBODIMENT

Figure 1:
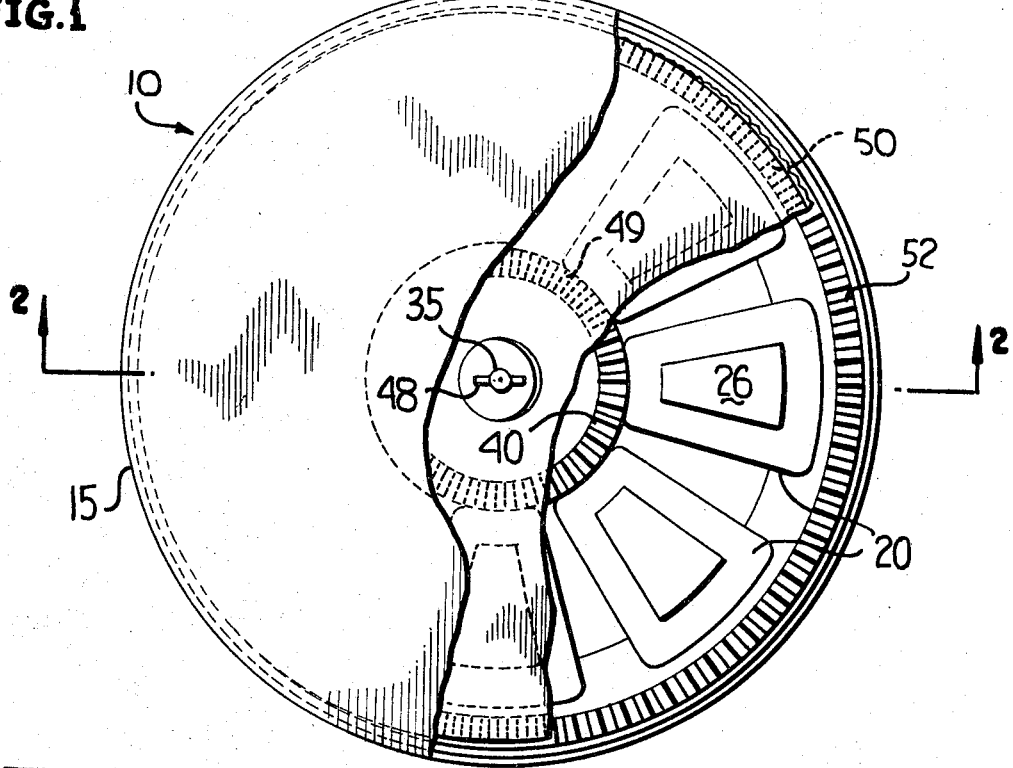
FIG. 1 is a partially fragmented plan view of the interior of a step motor according to the invention.

Referring now to the drawing, the step motor includes a housing 10 having a pair of coaxial cylindrical walls 12, 13 bridged at a common end 15 by a wall 17. The housing may be composed of any suitable non-magnetic material and is constructed to partially enclose and retain the field windings 20 and core 21 of stator 25.

The core is provided with a plurality of equiangularly spaced pole members 26 on which coils 20 are wound, the coils having terminal leads (not shown) which may be brought out through the housing at any convenient location for connection to a suitable energizing circuit (not shown). Preferably, the latter circuit is of the type that produces excitation of adjacent motor phases in successive pairs, but other known types of driver circuits may alternatively be employed. The pole faces 32 of core 21 are milled off at a slight angle, 1° for example, to accommodate the tilting of a rotor as will presently be described in greater detail.

A shaft 35 extends along the axis of symmetry of the motor structure, and may be mounted for rotation in suitably placed bearings (not shown) at either end of the housing. Keyed or otherwise suitably fastened to the shaft is a circular ring gear 40 whose teeth projected upwardly as viewed in FIG. 2. As a result of this physical coupling, the shaft follows the rotation of gear 40, or vice versa.

Rotor 43 is coupled to the shaft via a universal ball joint, generally designated as 45, which provides a pivot for the rotor and permits longitudinal freedom along the shaft while constraining the rotor in a radial direction. Hence, the rotor may undergo rotation relative to the shaft while tilted relative thereto. A retaining ring 48 is press-fitted on the shaft to prevent the rotor from undergoing excessive lift.

The rotor, which may be a magnetically permeable disk, is provided on its underside (as viewed in FIG. 2) with a circular ring gear 49 opposite and cooperating with the ring gear 40 that is fastened to shaft 35. An outer ring gear 50 is also fastened to the underside of the rotor adjacent its periphrey, for cooperation with stationary ring gear 52 attached to housing 10. The relative positions of the several ring gears are such that confronting teeth on the respective gears can mesh only within a limited area along a common sector from the axis at any given instant of time. As disclosed in my aforementioned pending application Ser. No. 664,331, the outer ring gears 50, 52 may have a slight tooth differential, while inner ring gears 40 and 49 have an identical number of teeth.

By virtue of this gear arrangement and the remaining structural configuration, the rotor may be wobbled about the axis of symmetry as a result of attraction to the stator poles by sequenial energization of respective adjacent stator windings. As it wobbles, the rotor runs on "tracks" provided by the two sets of gears, and effects the driving of the shaft. Specifically, the field windings are preferably energized in the switching format A+B, B+C, C+D, D+E, et cetera, the rotor or armature being pulled toward the energized windings in the recited sequence. Thus, the two outer gears 50, 52 mesh along a sector region, and this meshed region propagates with the phase switchings, to produce the wobble of the rotor about the shaft. The slight angle at which the pole faces are milled with respect to a plane perpendicular to the shaft accommodates the least angle of wobble of the rotor, as will be discussed in greater detail presently. Because of the differing number of teeth on the rotor and stationary outer gears 50 and 52, respectively, relative rotation takes place between these elements as the sector of meshing rotates one full revolution, i.e., for each 360° of "wobble-around" of the rotor. If, for example, rotor ring gear 50 has 359 teeth and stationary ring gear 52 has 360 teeth, the rotor rotates 1°, which coincides with one tooth, for each 360° of rotor wobble, and in a direction opposite that of the wobble. On the other hand, if the number of teeth on rotor ring gear 50 is greater than the number of teeth on the stationary ring gear 52, the relative rotation is in the same direction as the wobble.

As wobble disk 43 rotates, the teeth of inner gears 40 and 49 mesh in a corresponding sector to the meshing of gears 50, 52; and since the rotor undergoes the aforementioned slow rotation, the shaft is driven in rotation even if the number of teeth on gears 50, 52 is identical, as is preferred. In that event, for the stated number of teeth in the example above, the shaft undergoes one degree of rotation per full revolution of wobble. With eight field windings (phases), each revolution of wobble requires 8 phase switchings. Accordingly, each 360° rotation of the shaft requires 8×360=2880 steps or phase switchings. Meshing of the two sets of gears in the aforementioned manner is maintained irrespective of slight imperfections in or unevenness of the teeth of the two sets of gears, and despite gear wear occuring with continued use of the motor, as a consequence of the axial freedom of ball joint 45 and hence of rotor 43. The magnetic field generated in accordance with the switching format excitation of the stator windings produces a force which is divided between the two sets of gears and assures substantially equal meshing pressure on the gears at the sector correponding to the actuated stator coils. The absence of radial motion of the ball joint, and hence of the rotor (wobble disk), further assures accurate rotation of the output shaft without looseness of play between gears.

The force exerted on the gears by the switching magnetic field accompanying the sequential energization of the field windings produces cocking or tipping of rotor 43, which in heretofore disclosed embodiments of the wobble rotor step motor, occurs at a tilt angle defined by fixed relative locations of elements. In accordance with the present invention, however, this tilt angle or wobble angle is rendered variable, for reasons stated earlier herein, by the inclusion of means for concomitantly varying the axial location of the rotor and cooperating inner ring gear 40 coupled to shaft 35. In the exemplary embodiment herein disclosed, such means comprises solenoid coil 58, wound about non-magnetic cylindrical wall 13 of housing 10, core 60, attached to shaft 35 below the shaft coupling member for gear 40, and spring 61, coiled about the shaft below core 60 and retained within non-magnetic cup-like member 63 fastened to the bridging portion 17 of housing 10.

Figure 2:
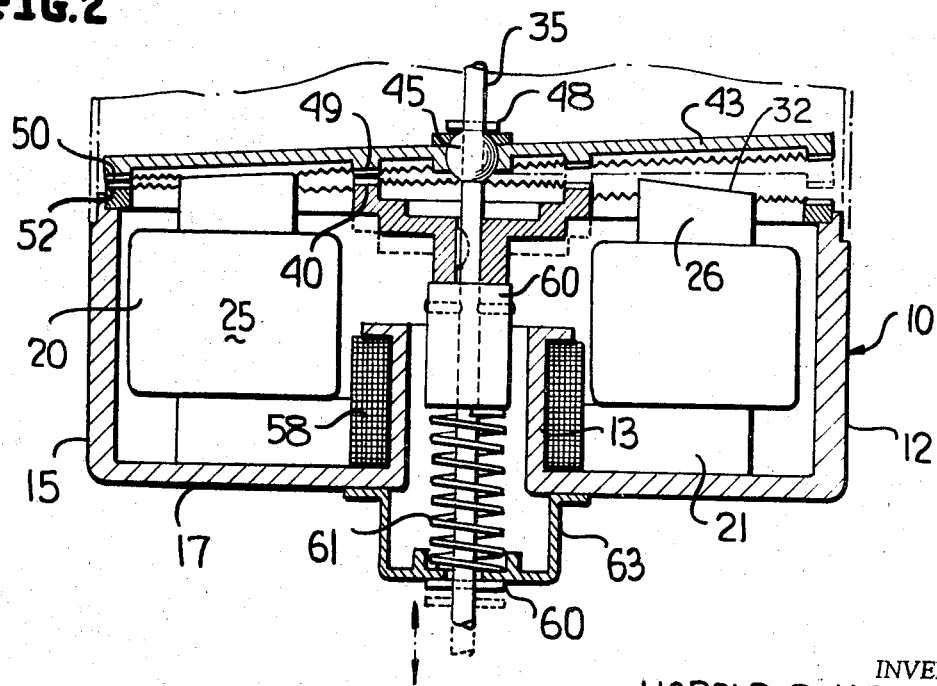
FIG. 2 is a sectional view of the motor of FIG. 1 in a plane containing the axis of the motor.

As shown in FIG. 2, core 60 is attached to shaft 35 and, with solenoid coil 58 in the normally de-energized state, assumes a position dictated by the normal (virtually uncompressed) length of spring 61. With core 60 in this normal position, gear 40 and rotor 43 are disposed in the axial locations shown in FIG. 2, such that the tilt angle of the rotor assumes a maximum value governed by the constraint imposed by a non-magnetic cover (not shown) which is attached to the housing and against which ring 48 abuts, as well as by another retaining ring 66 press-fitted on the other end of the shaft. The latter ring abuts against the exterior of member 63 when the core 60 is in its normal position. This arrangement is employed when the rotor is to be wobbled at a slow rate or is stopped, and assures high stepping or positioning accuracy in the angular displacement of the rotor (and hence of the shaft).

For high speed operation, i.e., high wobble rate, solenoid coil 58 is selectively energized by any suitable power source (not shown) via leads brought through the motor housing, to draw core 60 axially further into the coil (i.e., downwardly as viewed in FIG. 2), against the force exerted by spring 61 as it undergoes compression. Thereby, gear 40 and rotor 43 are correspondingly displaced axially to the positions indicated by the dotted lines in FIG. 2, at which the tilt angle or wobble angle is a minimum value (e.g., 1°).

Various other arrangements may be utilized within the scope of my invention. For example, another solenoid section may be utilized instead of spring 63, to increase the tilt angle. Moreover, an armature with an electromagnet could be employed rather than a solenoid. In addition, the inventive principles and concepts disclosed herein may readily be applied to step motors of the dual stator type.

Accordingly, while I have disclosed a preferred embodiment of my invention it will be apparent that variation of the details of construction which have been illustrated and described may be resorted to without departing from the spirit and scope of the invention, as defined by the appended claims.

I claim:
1. A motion transmitting system comprising a pair of cooperating gears having confronting frictional surfaces projecting from normally spaced generally parallel planes, electromagnetic means for selectively deflecting one of said gears relative to the other to produce frictional contact of said surfaces over only one limited region of both gears at any given instant, said gears having different dimensions for said frictional surfaces so that deflection of one of said gears into contact with the other of said gears is accompanied by relative rotation of said pair of gears, means for establishing a first spacing between said gears when parallel, means for establishing a second spacing between said gears when parallel different from said first spacing and energizable motor means for changing the spacing between said gears from said first spacing to said second spacing whereby the amount of deflection required to produce said frictional contact over said limited region is changed.

2. The invention according to claim 1 wherein at least one of said gears is secured against rotation.

3. The invention according to claim 1 wherein said signal operated motor means for selectively varying the normal spacing between said gears includes a magnetically permeable core, and a solenoidal coil cooperating with said core to effect displacement of said core relative thereto when energized, said core being mechanically coupled to one of said gears.

4. The invention according to claim 3 wherein said means for selectively varying said normal spacing further includes spring means for effecting a return to said normal spacing upon de-energization of said coil.

5. A step motor comprising
a shaft,
at least one pair of cooperating substantially planar ring gears having confronting spaced frictional surfaces and having a common axis with said shaft,
a rotor supporting one of said gears,
means pivotally coupling said rotor to said shaft to permit inclination of said rotor relative to said shaft,
means for selectively forcing said rotor to pivot on said coupling means to sequentially force different portions of said gears into frictional contact,
said frictional surfaces of said pair of gears having different circumferential dimensions such that deflection of said one of said gears into contact with the other of said gears of said pair of gears produces rotation of said gears about said common axis relative to one another,
means for coupling one of said pair of gears to said shaft to induce rotation of said shaft upon relative rotation between said pair of gears,
motor means for selectively translating said shaft to change the spacing of said frictional surfaces to vary the angle of inclination of said rotor at which said frictional contact is achieved, and
means for coupling said motor means to said shaft such that said motor means applies only a translatory force to said shaft.

References Cited
UNITED STATES PATENTS

Re. 22,549   9/1944   Plensler _____ 310—82

FOREIGN PATENTS 411,282   6/1934   Great Britain.

MILTON O. HIRSHFIELD, Primary Examiner

M. O. BUDD, Assistant Examiner